Sept. 6, 1932.    E. A. WAKEFIELD    1,876,367
VALVE PAD CONSTRUCTION
Filed May 16, 1931
Fig. 1.
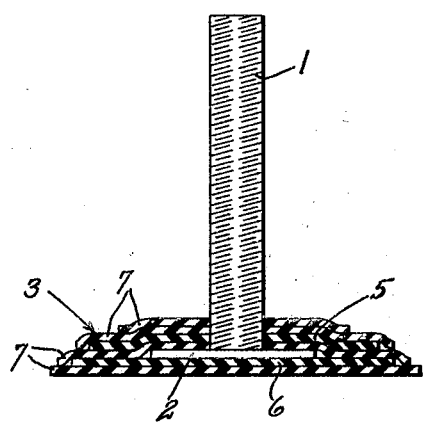
Fig. 2.
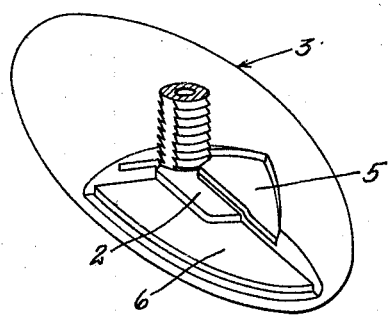
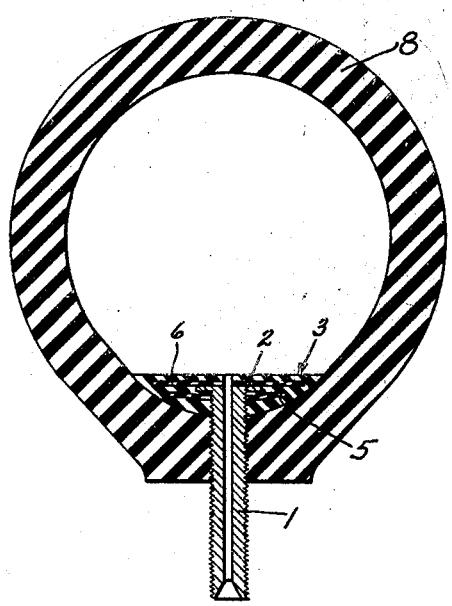
Fig. 3.
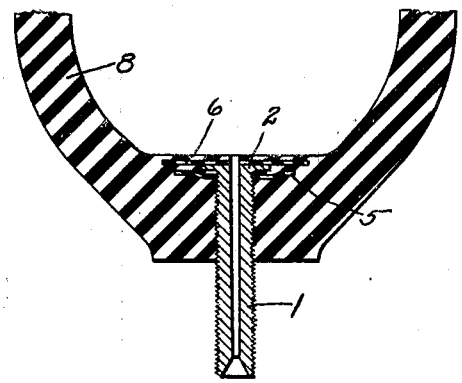
Fig. 4.
INVENTOR.
ERNEST A. WAKEFIELD
BY Chapin & Neal
ATTORNEY.

Patented Sept. 6, 1932

1,876,367

UNITED STATES PATENT OFFICE

ERNEST A. WAKEFIELD, OF SPRINGFIELD, MASSACHUSETTS, ASSIGNOR TO ROLAND W. BOYDEN AND CHARLES A. DANA, RECEIVERS OF THE FISK RUBBER COMPANY, OF CHICOPEE FALLS, MASSACHUSETTS, A CORPORATION OF MASSACHUSETTS

VALVE PAD CONSTRUCTION

Application filed May 16, 1931. Serial No. 537,773.

This invention relates to fluid pressure cores or so-called air or water bags used in the vulcanization of pneumatic tire casings. More particularly it has in view an improvement in the valve portion of such bags.

These bags are in the form of annular or segmental rubber or rubber and fabric tubes which are inflated through a valve stem vulcanized into the wall of the tube. The point of attachment of the valve stem is a point of weakness since the rubber of the bag tends to separate from the metal of the stem and its base, permitting the stem to pull out, this tendency being accentuated by flexing of the bag near or at the valve stem which may occur when the bag is inserted or romoved from a tire casing.

In the past it has been customary to provide fabric reinforcements around the valve stem to stiffen the bag at that point and to increase the resistance to the pulling out of the stem. This construction has several disadvantages. After repeated use the fabric tends to separate from the rubber and being pliable permits undue flexing of the bag at the valve stem. When a break occurs exposing the fabric on the inside, glycerin, which is introduced into the bag prior to the curing of the tire, tends to follow along the fabric and escape around the valve stem into the tire casing, causing under curing of the casing wherever it comes in contact with the latter.

It is the principal object of the present invention to overcome the above disadvantages of the prior constructions and to provide a structure of increased strength and longer life. Other and further objects will be apparent from the following specification and claims.

In the accompanying drawing which illustrates one embodiment of the invention.

Fig. 1 is a side elevation, partly in section, of a valve and pad assembly, made according to the invention, in its uncured state;

Fig. 2 is a prospective view of the completed assembly partially cured and ready for insertion in the bag, parts being broken away;

Fig. 3 is a transverse sectional view showing the assembly of Fig. 2 positioned in the bag but prior to the vulcanization of the latter; and Fig. 4 is a view similar to Fig. 3 but showing the bag after vulcanization.

Referring to the drawing, 1 indicates the valve stem which is formed of metal and provided with a metal base or anchoring plate 2. As shown in Fig. 1, the valve pad 3 is built up of layers of rubber, usually cut in oval shape and of decreasing dimension. According to the present invention the rubber layers 5 and 6 above and below the base plate 2 are formed of a stiff hard rubber compound while the remaining layers 7 are of soft rubber such as air bag compound. The assembly as shown in Fig. 1 is given a partial cure in a suitable mold to give it the shape shown in Fig. 2, the rubber of layers 7, after the partial cure, forming a homogeneous soft rubber pad body in which the base plate 2 and hard rubber layers 5 and 6 are imbedded. The semi-cure structure is placed in position in the raw air bag 8 as shown in Fig. 3 and the whole subjected to the final cure which completes the cure of the pad rubber; the pad body uniting in a homogeneous manner and becoming part of the wall of the bag as shown in Fig. 4, layers 5 and 6 being cured to the desired degree of hardness.

Hard rubber has the property of forming a firm band with rubber and with metal so that the valve is held firmly in the bag wall with a minimum tendency toward separation. The hard rubber is also much stiffer than the fabric heretofore used and is not subject to deterioration as is the fabric. Leakage of glycerin around the valve stem is completely prevented and the force necessary to pull the stem from the bag is substantially increased.

While I have described the invention as applied to tire curing bags, it will be understood that it has substantial advantages when applied to inner tubes for pneumatic tires, particularly for bus and truck service, where substantial heat is generated and the tube may suffer substantial distortion.

Having thus described my invention, I claim:

1. In combination an annular rubber tube, a valve stem having an anchor plate imbedded in the wall of the tube, a layer of hard rubber bonded to the inner face of the anchor plate and extending substantially beyond the edges of said plate, a layer of hard rubber positioned on the opposite side of the anchor plate and bonded to the base of the stem, said last named layer of hard rubber extending beyond the edges of the anchor plate, the free edges of both said layers of hard rubber being imbedded in, bonded to, and separated from each other by the rubber of the tube.

2. In combination an annular rubber tube, a valve stem having an anchor plate embedded in the wall of the tube, an inner layer of hard rubber bonded to the inner face of the anchor plate and extending substantially beyond the edges of said plate, an outer layer of hard rubber positioned on the opposite side of the anchor plate, spaced therefrom, and bonded to the base of the stem, said outer layer of hard rubber extending beyond the edges of the plate, the free portions of both hard rubber layers being imbedded in and bonded to the rubber of the tube, the tube rubber separating the outer hard rubber layer from the outer face of the anchor plate and from the inner hard rubber layer.

3. A valve stem assembly for rubber tubes which comprises a valve stem having an anchor plate imbedded in a pad of soft rubber, a layer of hard rubber bonded to the inner face of the anchor plate and extending substantially beyond the edges of said plate, a layer of hard rubber positioned on the opposite side of the anchor plate and bonded to the base of the stem, said last named layer of hard rubber extending beyond the edges of the anchor plate, the free edges of both said layers of hard rubber being imbedded in, bonded to, and separated from each other by the soft rubber of the pad.

4. A valve stem assembly for rubber tubes which comprises a valve stem having an anchor plate imbedded in a pad of soft rubber, an inner layer of hard rubber bonded to the inner face of the anchor plate and extending substantially beyond the edges of said plate, an outer layer of hard rubber positioned on the opposite side of the anchor plate, spaced therefrom, and bonded to the base of the stem, said outer layer of hard rubber extending beyond the edges of the plate, the free portions of both hard rubber layers being imbedded in and bonded to the soft rubber of the pad, the pad rubber separating the outer hard rubber layer from the outer face of the anchor plate and from the inner hard rubber layer.

In testimony whereof, I have affixed my signature.

ERNEST A. WAKEFIELD.